United States Patent [19]

Swinderman et al.

[11] Patent Number: 4,925,434
[45] Date of Patent: May 15, 1990

[54] TORSICONAL TENSIONING DEVICE

[75] Inventors: R. Todd Swinderman, Kewanee; David W. Mueller, Neponset, both of Ill.

[73] Assignee: Martin Engineering Co., Neponset, Ill.

[21] Appl. No.: 403,562

[22] Filed: Aug. 31, 1989

[51] Int. Cl.$^5$ .............................................. F16H 7/08
[52] U.S. Cl. ..................................... 474/101; 198/499; 464/154
[58] Field of Search ................... 474/101, 109–111, 474/113–117, 133, 135, 136, 138; 198/497, 499; 464/88, 154; 403/223

[56] References Cited

U.S. PATENT DOCUMENTS

| | | | |
|---|---|---|---|
| 2,867,102 | 1/1959 | Williams | 464/88 |
| 2,867,103 | 1/1959 | Williams | 464/88 |
| 3,674,131 | 7/1972 | Matson | 198/499 |
| 4,171,920 | 10/1979 | Kramer et al. | 403/223 |
| 4,533,035 | 8/1985 | Reiter | 198/499 |
| 4,533,036 | 8/1985 | Gordon | 198/499 |

Primary Examiner—Thuy M. Bui
Attorney, Agent, or Firm—Lee, Mann, Smith, McWilliams & Sweeney

[57] ABSTRACT

A tensioning device is provided for selecting and imparting torsional bias to a shaft and simultaneously providing a shock absorbing mechanism, the device including a first hub member selectively connectable to the shaft, a second hub member rotatable wiht respect to the first hub member, a torsion coupling of elastomeric material connected at a first end to the first hub and at the other end to the second hub, and a locking mechanism to lock the second hub to a stationary frame member when the desired torque has been reached.

16 Claims, 2 Drawing Sheets

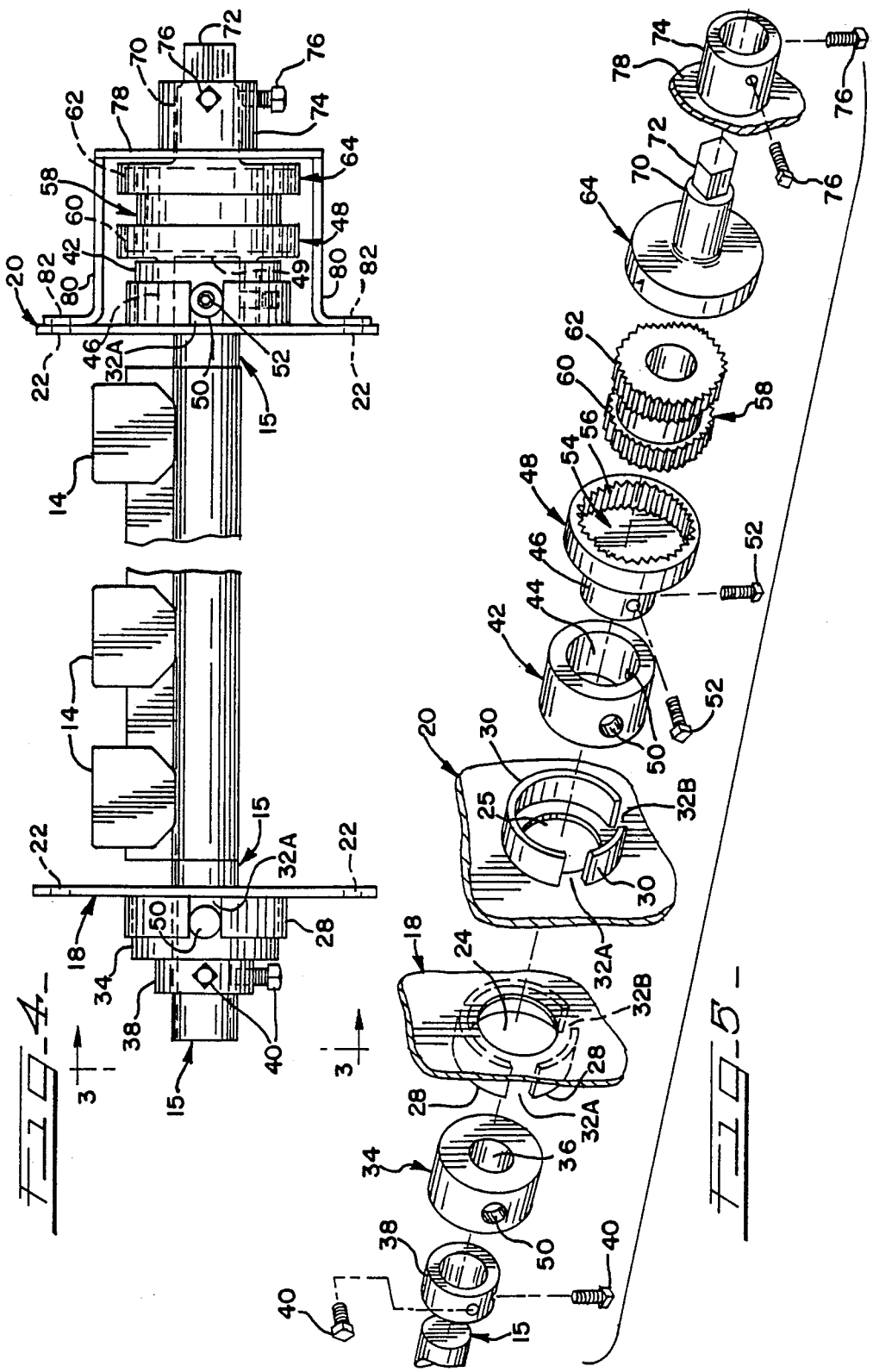

TORSICONAL TENSIONING DEVICE

BACKGROUND OF THE INVENTION

The present invention relates to a tensioning device which is used to select and impart a moment of torque to an attached member such as a shaft, and which will bias the attached member to maintain contact between the attached member and a second member. The present torsional tensioning device has been found to be particularly useful in connection with conveyor belt cleaners which utilize scraper blades to clean the belt. Conveyor belt scraper blades are conventionally mounted on a shaft which is transverse to the direction of conveyor belt travel and are rotated into contact with the belt to scrape off adherent material. Over time the scraper blades wear down and lose contact with the belt thereby hampering the blades cleaning ability. The shaft on which the scraper blades are mounted must then be rotated to reposition the scraper blades against the belt.

Conveyor belt scraper blades are subjected to repeated impact forces which are generated by the blades coming into contact with conveyor belt splices and enlarged pieces of the conveyed material or debris which adhere to the belt, all of which can cause appreciable damage to the scraper blades or the conveyor mechanism. To promote effective cleaning of the conveyor belt and to avoid shutting the belt down for repair, it is of the utmost importance to provide the scraper blades with a shock absorbing capability.

Previous torsional tensioning devices of the type shown in U.S. Pat. No. 4,533,036 have been used in connection with conveyor belt scraper blades. Because of their construction, they have extended a substantial distance from the conveyor chute wall and have obstructed adjacent walkways, which on most conveyor installations are compact and have a minimum amount of clearance. Prior devices also required the use of special wrenches and did not allow for infinite settings of torque as opposing holes needed to be matched up for the insertion of connecting pins. In those devices utilizing connecting pins, the situation is often encountered where the torque that can be applied with just one hand is not quite enough to match up the opposing holes thereby requiring the use of both hands on the wrench to achieve the next hole to line up with the pin hole. This results in a second person being needed to insert the connecting pin. Prior devices also rigidly coupled the torsional device to the shaft of the cleaner blades making it likely that if the shaft should become bent, the bending force would be transmitted through the torsional device and to the person imparting the torque to the torsional sleeve. Prior devices also required rigid members inside or outside of the torsional sleeve to provide support to prevent the buckling or collapse of the torsional sleeve. Flexible couplings used in connection with shafts are shown in U.S. Pat. Nos. 2,867,102 and 2,867,103. Torsional springs are shown in U.S. Pat. Nos. 3,674,131; 4,171,920; and 4,533,036.

SUMMARY OF THE INVENTION

The present invention provides a torsional tensioning device which is particularly useful in biasing conveyor belt scraper blades into contact with a conveyor belt. The scraper blades are connected to a rotatable shaft. A moment of torque is applied to the shaft through an elastomeric coupling which extends between two hubs, one hub being fastened to an end of the shaft and the other hub rotating within a fixed collar having set screws. An infinite range of torques may be selected and applied to the shaft by rotating the hub within the fixed collar any angular amount desired and then securing the rotated hub with the set screws. The coupling transmits the selected moment of torque to the shaft. The arrangement of the present invention does not require the shaft or any other rigid member to extend within or around the torsion coupling to provide support. The torsion coupling's width is less than its diameter allowing for a compact device which does not protrude significantly into adjacent areas. The torsion coupling as well as elastomeric bushings which are located at each end of the shaft provide a shock absorbing mechanism for the scraper blades.

DESCRIPTION OF THE DRAWINGS

FIG. 4 is a front elevational view, partially broken away, of the torsional tensioning device.

FIG. 5 is an exploded view of a portion of the torsional tensioning device.

DESCRIPTION OF THE PREFERRED EMBODIMENT

Figure 1:
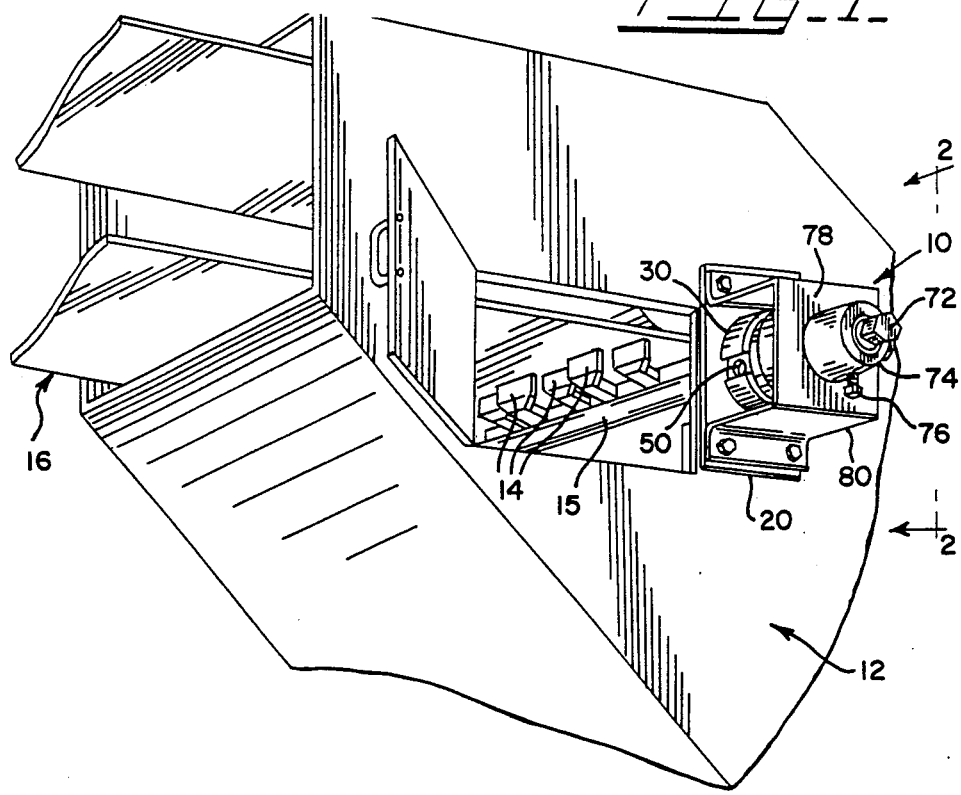
FIG. 1 is a perspective view of the torsional tensioning device shown installed in a conveyor chute for maintaining scraper blade contact with the conveyor belt.
Figure 2:
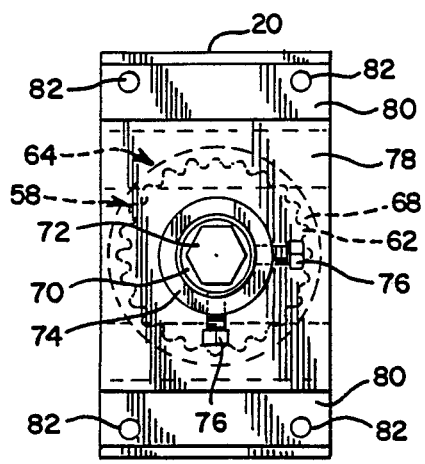
FIG. 2 is a side elevational view of the torsional tensioning device taken along the lines 2—2 of FIG. 1 showing the torsion and the second hub in phantom.
Figure 3:
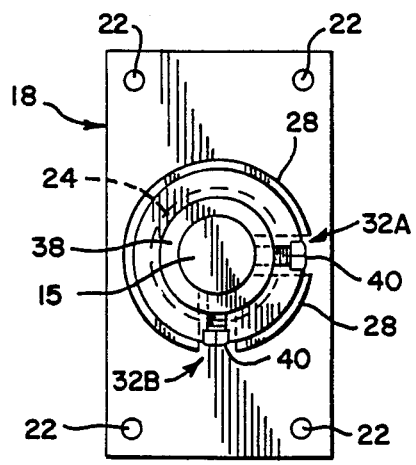
FIG. 3 a side elevational view of the torsional tensioning device taken along the lines 3—3 of FIG. 4 showing the freely end of the shaft.

FIG. 1 illustrates the tensioning device 10 fastened to the outside of a conveyor chute 12. A plurality of scraper blades 14 are removably secured to a shaft 15 and are shown in scraping engagement with a conveyor belt 16.

The tensioning device 10 has a first mounting plate 18 and a second mounting plate 20 which are removably fastened to opposite ends of the conveyor chute 12 or other stationary member through apertures 22. Each mounting plate 18 and 20 respectively includes a centrally located aperture 24, 25 through which shaft 15 extends. A pair of circular retainer sleeves 28 and 30, best shown in FIG. 5, are mounted respectively to each of the first and second mounting plates 18 and 20 and are respectively located concentrically around apertures 24 and 25. Retainer sleeve 30 includes a pair of cutout portions 32A and 32B. Although not required, the retainer sleeve 28 also includes cutout portions 32A and 32B to make the first mounting plate 18 and the second mounting plate 20 interchangeable.

An elastomeric bushing 34 is located concentrically within retainer sleeve 28. The elastomeric bushing 34 has a centrally located aperture 36 through which shaft 15 extends. Aperture 24 of mounting plate 18 is larger in diameter than aperture 36 to insure that vibrations from the shaft 15 are absorbed by bushing 34 and are not transmitted to the first mounting plate 18. A locking collar 38 having a pair of set screws 40 is located concentrically surrounding the shaft 15 and abuts and secures the elastomeric bushing 34 against mounting plate 18.

A second elastomeric bushing 42 is located concentrically within retainer sleeve 30 and includes a central aperture 44. A first hub 48 has a stem 46 adapted to lie within aperture 44. The stem 46 has a hollow socket at one end. A pair of set screws 52 are threaded into the stem 46 at right angles to one another. An end of shaft 15 fits concentrically within the hollow socket in stem 46 and abuts against an end wall 49 within the stem 46, thereby confining the travel of the end of shaft 15 to within the hollow socket of the stem 46. The end of shaft 15 is releasably secured within the socket by set screws 52. The bushing 42 is sized to concentrically surround stem 46 and includes a pair of apertures 50 for providing access to the set screws 52. Aperture 25 of the second mounting plate 20 is the same diameter as that of aperture 24, both being of a sufficiently larger diameter than the shaft 15 to prevent shaft vibrations from being transmitted to the mounting plates 18 and 20.

To make the elastomeric bushings 34 and 42 initially interchangeable, elastomeric bushing 42 is initially made with its central aperture 44 having the same diameter as the central aperture 36 of the first elastomeric bushing 34, and although not required, the first elastomeric bushing 34 is made to include apertures 50. When it is desired to produce the second elastomeric bushing 42 the central aperture 44 is bored out to a larger diameter to accommodate the stem 46 of the first hub 48.

The first hub 48, at the end opposite the stem 46, defines a hollow cylindrical chamber 54, best shown in FIG. 5, with a plurality of adjacent teeth and grooves in wall 56. An elastomeric coupling in the form of a torsion sleeve 58 has a first saw-tooth shaped flange 60 at a first end and a second saw-tooth shaped flange 62 at the other end. One such torsion sleeve 58 is the Wood's SURE-FLEX sleeve type JES or JN. The first saw-tooth shaped flange 60 of the torsion sleeve 58 fits within and interlocks with the saw-tooth shaped walls 56 of the first hub 48. A second hub 64 is provided with a hollow cylindrical chamber substantially identical to chamber 54 having saw-tooth shaped walls 68. The saw-tooth shaped walls 68 of the second hub 64 fit concentrically around and interlock with the second saw-tooth shaped flange 62 of the torsion sleeve 58. A stem 70 extends axially from the second hub 64. The stem 70 has a hexagonal end 72 which extends concentrically through a fixed collar 74 which is provided with a pair of set screws 76 located at right angles to one another.

Collar 74 is affixed to plate 78 which has a pair of L-shaped brackets 80 affixed at opposite ends of plate 78. The short leg of the L-shaped brackets 80 each include a pair of apertures 82 which are aligned with apertures 22 of the second mounting plate 20. The second mounting plate 20 and the L-shaped brackets 80 are removably fastened to the conveyor chute wall 12 or other stationary object through apertures 22 and 82.

In operation, when the conveyor belt cleaner is being assembled, the shaft 15 is positioned generally perpendicular to the direction of conveyor belt travel and extending through plates 18 and 20. The locking collar 38 is positioned over the shaft and slid inwardly until it abuts the first elastomeric bushing 34 which is forced against the first mounting plate 18. The collar 38 is then fastened to the shaft 15 by set screws 40.

Similarly, the first hub 48 abuts the second elastomeric bushing 42 against the second mounting plate 20 and is fastened to shaft 15 by set screws 52 which extend through bushing 42 and stem 46 until they engage one end of shaft 15 which is now disposed in the hollow socket in the stem 46. Access to set screws 52 is gained through cutout areas 32A and 32B and through apertures 50 in the second elastomeric bushing 42. The shaft 15 is thereby restrained from moving in a direction relative to its longitudinal axis. The shaft 15 is allowed to freely rotate within the first elastomeric bushing 34 and the stem 46 of the first hub 48 will freely rotate within the second elastomeric bushing 42. The elastomeric bushings 34 and 42 will absorb shock forces which are transmitted to the shaft 15 through the scraper blades 14.

In order to bias the scraper blades into engagement with the conveyor belt, the set screws 76 are loosened. A common wrench or a socket wrench may be used to rotate hexagonal end 72 of the second hub 64 in a clockwise direction, as viewed in FIG. 1, which thereby rotates shaft 15 clockwise until the scraping blades 14 come into contact with conveyor belt 16. The hexagonal end 72 is then further rotated to produce the desired moment of torque which in turn urges the scraping blades 14 against the conveyor belt 16 with the desired amount of force. As the hub 64 is rotated with no corresponding rotation of the hub 48 a torsional biasing moment is simultaneously input into the sleeve 58 and applied to the shaft 15. When the desired amount of torsional bias has been produced in the torsion sleeve 58, the set screws 76 are tightened against stem 70 of the second hub 64 thereby fixing the second hub 64 against rotation and connecting the hub 64 to the fixed frame. As the scraper blades 14 wear down, the torsion sleeve 58 will begin to untwist thereby causing the shaft 15 to rotate further clockwise so that the scraper blades 14 will remain in contact with the conveyor belt 16, with the force lessening somewhat. The shaft 15 will continue to rotate as the blades wear until the torsion sleeve 58 returns to its original non-biased position. The torsion sleeve 58, in either its twisted or untwisted condition, will absorb any rotational forces or shocks that are transmitted to the shaft 15 by the scraper blades 14 thereby preventing these shocks from being transmitted to the second hub 64 and to the person rotating the second hub 64. Such a condition is frequently encountered when a mechanical splice passes by the cleaner blade.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A tensioning arrangement for imparting torsional bias to a shaft, said tensioning arrangement including:
   a first hub member connectable to said shaft;
   a second hub member rotatable with respect to said first hub member;
   a torsion coupling of elastomeric material connectable at one end to said first hub member and at said other end to said second hub member;
   means to rotate said second hub member to simultaneously input a torsional biasing force into said coupling and to said shaft;
   means to selectively connect said second hub member to a fixed frame member to thereby prevent rotation of said second hub member; whereby said tensioning arrangement provides for selecting and imparting a torsional biasing force on said shaft and simultaneously providing a shock absorbing mechanism to permit rotation of said shaft when an external torsional force greater than said biasing force is applied to said shaft.

2. A tensioning arrangement as in claim 1 in which said first hub member defines a socket therein to receive an end of said shaft.

3. A tensioning arrangement as in claim 2 in which said socket defines an end wall against which said end of said shaft abuts to limit the lateral movement thereof.

4. A tensioning arrangement as in claim 2 including fastening means to selectively secure said shaft within said socket.

5. A tensioning arrangement as in claim 1 in which said first and second hubs each define chambers therein adapted to receive an end of said torsion coupling and including means to secure said coupling to said hubs.

6. A tensioning arrangement as in claim 1 wherein said means to selectively connect said second hub member to a fixed frame member includes a stem extending from said second hub member and a collar connected to said fixed frame member said collar defining an aperture therethrough and surrounding and overlying said stem and means for selectively connecting said collar to said stem to prevent relative rotation therebetween thereby connecting said second hub member to said fixed frame member.

7. A tensioning arrangement as in claim 1 including first bushing means adjacent one end of said shaft disposed between said shaft and said fixed frame member to absorb vibration imparted to said shaft.

8. A tensioning arrangement as in claim 7 including second bushing means adjacent said other end of said shaft disposed between said shaft and said fixed frame member to absorb vibration imparted to said shaft.

9. A tensioning arrangement for a conveyor belt cleaner having
a support shaft extending transversely of a conveyor belt in a direction generally perpendicular to the direction of conveyor belt travel and
a plurality of scraper blades mounted on said shaft, said blades rotatable into and out of scraping engagement with the belt to be cleaned, said tensioning arrangement including:
a first hub member connectable to said shaft;
a second hub member rotatable with respect to said first hub member;
a torsion coupling of elastomeric material connectable at one end to said first hub member and at said other end to said second hub member;
means to rotate said second hub member to simultaneously input a torsional biasing force into said coupling and to said shaft;
means to selectively connect said second hub member to a fixed frame member to thereby prevent rotation of said second hub member; whereby said tensioning arrangement provides for selecting and imparting a torsional biasing force on said shaft in a direction to bias the scraper blades into engagement with the belt to be cleaned and simultaneously providing a shock absorbing mechanism to permit rotation of said scraper blades away from said belt when a mechanical splice or other obstacle is encountered.

10. A tensioning arrangement as in claim 9 in which said first hub member defines a socket therein to receive an end of said shaft.

11. A tensioning arrangement as in claim 10 in which said socket defines an end wall against which said end of said shaft abuts to limit the lateral movement thereof.

12. A tensioning arrangement as in claim 10 including fastening means to selectively secure said shaft within said socket.

13. A tensioning arrangement as in claim 9 in which said first and second hubs each define chambers therein adapted to receive an end of said torsion coupling and including means to secure said coupling to said hubs to prevent relative rotation therebetween.

14. A tensioning arrangement as in claim 9 wherein said means to selectively connect said second hub member to a fixed frame member includes a stem extending from said second hub member and a collar connected to said fixed frame member, said collar defining an aperture therethrough and surrounding and overlying said stem and means for selectively connecting said collar to said stem to prevent relative rotation therebetween thereby connecting said second hub member to said fixed frame member.

15. A tensioning arrangement as in claim 9 including first bushing means adjacent one end of said shaft disposed between said shaft and said fixed frame member to absorb vibration imparted to said shaft.

16. A tensioning arrangement as in claim 15 including second bushing means adjacent said other end end of said shaft disposed between said shaft and said fixed frame member to absorb vibration imparted to said shaft.

* * * * *

UNITED STATES PATENT AND TRADEMARK OFFICE
CERTIFICATE OF CORRECTION

PATENT NO. : 4,925,434
DATED : May 15, 1990
INVENTOR(S) : R. Todd Swinderman and David W. Mueller It is certified that error appears in the above-identified patent and that said Letters Patent is hereby corrected as shown below:

In the title on the cover page delete "TORSICONAL" and insert therefore -- TORSIONAL --.

In the title at column 1, line 1, delete "TORSICONAL" and insert therefore -- TORSIONAL --.

Signed and Sealed this

Sixth Day of August, 1991

Attest:

HARRY F. MANBECK, JR.

Attesting Officer

Commissioner of Patents and Trademarks